March 26, 1946.   R. E. HAINES ET AL   2,397,348
ELECTRIC SOLDERING DEVICE
Filed Jan. 22, 1944

INVENTOR.
RAY E HAINES
JOHN V. ADAMS
BY

Patented Mar. 26, 1946

2,397,348

UNITED STATES PATENT OFFICE 2,397,348

ELECTRIC SOLDERING DEVICE

Ray E. Haines, Hastings on Hudson, and John V. Adams, New Rochelle, N. Y.

Application January 22, 1944, Serial No. 519,276

2 Claims. (Cl. 219—26)

This invention relates to an electric soldering device.

It is an object of this invention to provide a soldering device which may be permanently maintained upon the line for manufacturing purposes or for convenience in shop use, and which will maintain the temperature of the soldering point without danger of overheating it to the point of burning the surface.

It is a further object to provide a device in which the heating element is made so simple that there is no danger of its burning out, even under prolonged and continued use, and in which the device is heated by a step-down transformer of such a nature that substantially the entire heat generated in the apparatus, including any excess of heat generated in the primary of the transformer, may be made available to keep the soldering tip at its temperature.

The invention accordingly comprises a device possessing the features, properties and the relation of elements which will be exemplified in the article hereinafter described and the scope of the application of which will be indicated in the claims.

For a fuller understanding of the nature and objects of the invention, reference should be had to the following detailed description, taken in connection with the accompanying drawing, in which.

Figure 1:
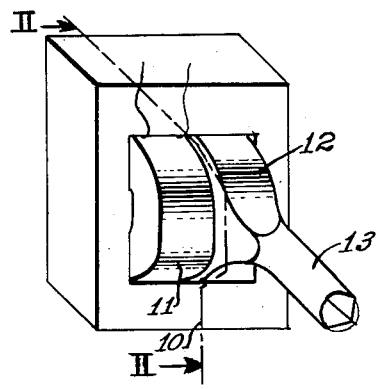
Fig. 1 is a perspective view of a device embodying this invention.

In accordance with this invention there is provided a core 10 carrying a primary 11 and a secondary 12, the latter of which includes the tip 13. The primary circuit 11 is wound with a proper number of turns so that it may be placed directly across the line. The secondary 12 comprises a single turn of copper short-circuited upon itself, which may be formed by cutting the coil as a complete, suitably shaped ring, from a block of soft copper, as will be seen from Fig. 2.

Figure 2:
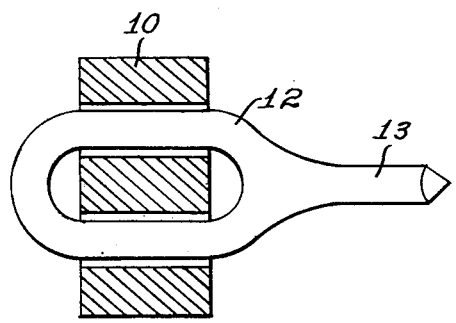
Fig. 2 is a section on the line 2—2 of Fig. 1.

The tip 13, as shown in Fig. 2, constitutes an integral part of the same piece of copper, so that there is continuous metallic heat conductivity between the coil and the tip.

The heating of this device arises from the short-circuited current flowing through the resistance of the secondary which heats the secondary, and because of the large size of the copper and its high heat conductivity, this maintains the tip at substantially the temperature of the coil itself. The primary coils 11 are also heated by the current flowing through them, but by reason of the fact that they are flat against the secondary coil, they cannot rise in temperature materially far above the temperature of the secondary coil, and any heat generated in them in excess of that radiated from the primary coil and core is immediately transferred to the secondary and helps to maintain that coil at its proper temperature. It will thus be seen that the constants of this circuit are not those which would ordinarily obtain in the design of a transformer, since in this instance, instead of attempting to effect an efficient electrical transfer with low heat losses, the apparatus is deliberately designed to create heat expenditure in the coil itself just equivalent to the heat radiated by the secondary coil and by the tip when at the soldering temperature.

The primary coil may be insulated with any insulation capable of maintaining the somewhat moderate temperatures required, but the secondary coil does not require insulation of any kind, since it is operated at heavy currents with a relatively insignificant voltage.

Figure 3:
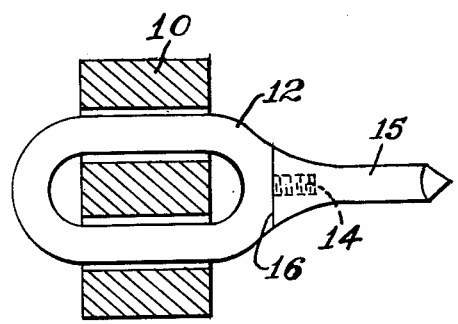
Fig. 3 is a section, similar to Fig. 2, of a slight modification of the device.

In the form of the invention disclosed in Fig. 3, the secondary coil 12 is not integral with the tip, but instead it is provided with a tongue 14 onto which a separate tip 15 may be screwed or otherwise fastened. This permits the use of interchangeable tips, but where such interchangeability is employed, it is desirable to have the maximum possible contact between the secondary coil and the tip, and to this end the tip is preferably arranged to butt against a flat surface 16 upon the side of the coil.

With the above construction it will be clear that all of the heat generated in the secondary and all of the surplus heat generated in the primary transferred to the secondary is available to maintain the temperature of the secondary, and because of the high heat conductivity, this temperature is immediately available to maintain the temperature of the tip at the desired value.

While it is not essential that the secondary shall be insulated in any way because of its low values, as mentioned above, there are advantages in insulating it, in so far as its closed circuit portion is concerned, so as to concentrate the radiation in the tip, and thereby reduce the total amount of heat which must be supplied by electrical energy.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. A device of the character described comprising, in combination, a closed magnetic core, a primary coil immediately surrounding said core and having its outer surface exposed for cooling, a secondary on a different portion of said core comprising a closed turn of copper immediately surrounding said core, and a soldering tip of copper integral with said secondary coil, said secondary being of such dimensions that the heat generated by the short-circuited current therein will maintain the tip at soldering temperature.

2. A device of the character described comprising, in combination, a closed magnetic core, a primary coil immediately surrounding said core and having its outer surface exposed for cooling, a secondary on a different portion of said core comprising a closed turn of copper immediately surrounding said core, and a soldering tip of copper in intimate heat conducting relation to said secondary, said secondary being of such dimensions that the heat generated by the short-circuited current therein will maintain the tip at soldering temperature.

RAY E. HAINES.
JOHN V. ADAMS.